(12) United States Patent
Felter et al.

(10) Patent No.: US 8,261,285 B2
(45) Date of Patent: Sep. 4, 2012

(54) PROCESSOR PACKING IN AN SMP SERVER TO CONSERVE ENERGY

(75) Inventors: Wesley Michael Felter, Austin, TX (US); Soraya Ghiasi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 12/059,952

(22) Filed: Mar. 31, 2008

(65) Prior Publication Data

US 2008/0184256 A1    Jul. 31, 2008

Related U.S. Application Data

(63) Continuation of application No. 11/002,526, filed on Dec. 2, 2004, now abandoned.

(51) Int. Cl.
*G06F 3/00* (2006.01)
*G06F 1/00* (2006.01)
*G06F 1/04* (2006.01)
(52) U.S. Cl. .......................... 719/310; 713/300; 713/375
(58) Field of Classification Search .................. 719/310; 713/300, 375
See application file for complete search history.

(56) References Cited

OTHER PUBLICATIONS

Sivarama P. Dandamudi, A Heirarchical Processor Scheduling Policy for Distributed-Memory Multicomputer System, Dec. 1997.*

* cited by examiner

*Primary Examiner* — Lechi Truong
(74) *Attorney, Agent, or Firm* — Yudell Isidore Ng Russell PLLC

(57) ABSTRACT

A data processing system includes a power supply, a plurality of processors wherein each processor is separately powerable by the power supply under operating system control. The operating system determines periodically a measure of system utilization and controls the switches to alter the number of active (powered) processors where the number of active processors reflects the measured system utilization and a set of utilization threshold values. System utilization may be based on the number of active tasks. The utilization thresholds preferably include a maximum threshold and a minimum threshold. A measured utilization exceeding the maximum threshold causes an increase in the number of active processors while utilization less than the minimum threshold causes a decrease in the number of active processors. The utilization thresholds may be determined from threshold factors that reflect time and date information, quality of service information, or a weighted average of historical utilization values.

10 Claims, 4 Drawing Sheets

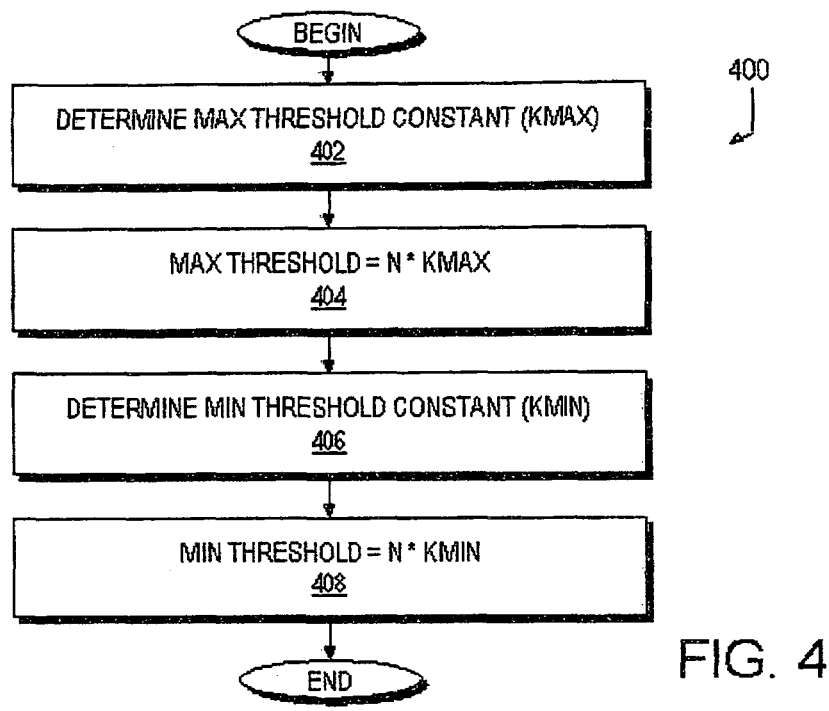
FIG. 4
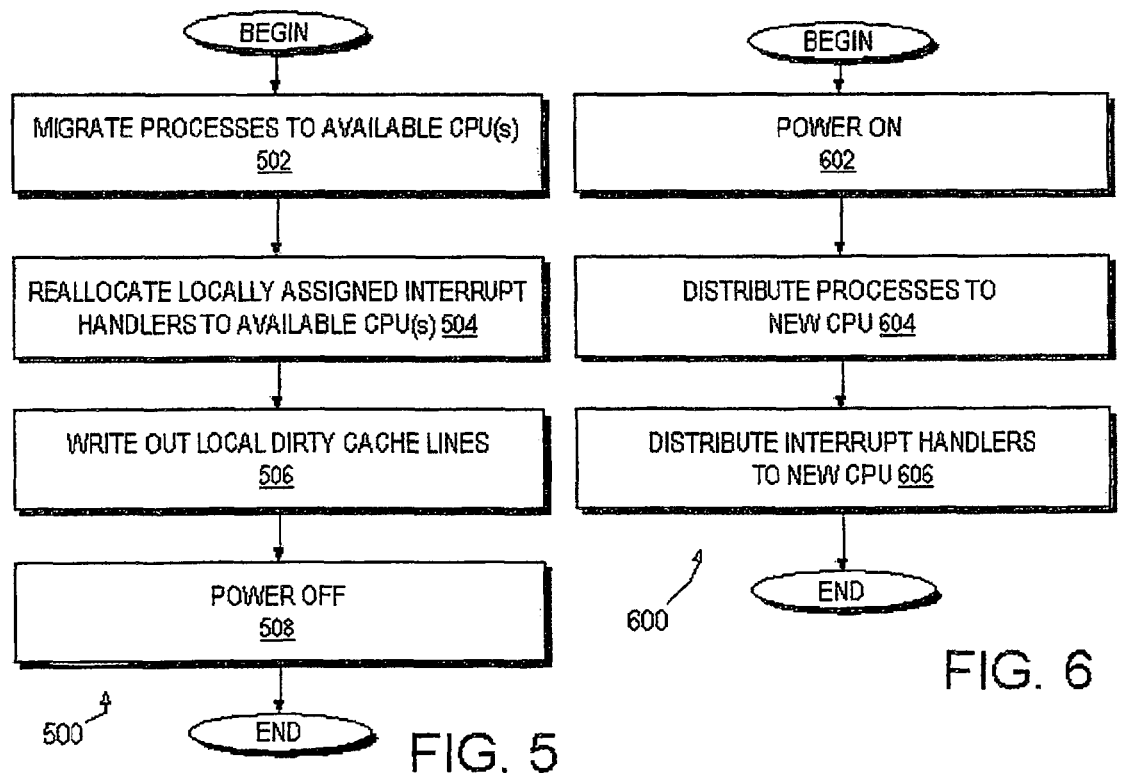
FIG. 5
FIG. 6

PROCESSOR PACKING IN AN SMP SERVER TO CONSERVE ENERGY

CROSS-REFERENCE TO RELATED APPLICATION

This a continuation of application Ser. No. 11/002,526, filed Dec. 2, 2004, now abandoned and titled Processor Packing in an SMP Server to Conserve Energy.

BACKGROUND

1. Field of the Present Invention

The present invention is in the field of data processing systems and, more particularly, conserving the amount of energy consumed by a data processing system.

2. History of Related Art

Many computer-based services and applications are characterized by a time varying workload. In typical multiprocessor server systems, however, the energy consumed by the system's main processors varies substantially less significantly than the workload. More specifically, the main processors consume significant energy even when they are idling or otherwise doing little actual work. In such systems, energy efficiency is undesirably low during times of low system utilization.

Various efforts to improve energy efficiency have been proposed. For example, clock gating, which is used in substantially all processors, may somewhat reduce the amount of power consumed during low utilization periods. Nevertheless, processors are generally characterized by relatively large leakage currents that result in significant energy consumption even during periods of zero utilization. While other energy conservation techniques, such as frequency and voltage scaling, can reduce energy consumption, they are generally difficult to implement in multiprocessor systems and may provide unacceptable performance when rapid responses are needed. It would be desirable, therefore, to implement a system and method for conserving energy in a multiprocessor data processing system.

SUMMARY OF THE INVENTION

The identified objective is achieved with a data processing system that includes a power supply and a plurality of processors. The power supply provides electric power (voltage) to each of the processors. The system includes a mechanism for controlling the application of power to individual processors, preferably under operating system control, so that the system can switch the power provided to any individual processor on or off. The operating system determines periodically a measure of system utilization and controls the switches to alter the number of active (powered) processors where the number of active processors reflects the measured system utilization and a set of utilization threshold values. System utilization may be based on the number of active tasks. The utilization thresholds preferably include a maximum threshold and a minimum threshold. A measured utilization exceeding the maximum threshold causes an increase in the number of active processors while utilization less than the minimum threshold causes a decrease in the number of active processors. The utilization thresholds may be determined from threshold factors that reflect time and date information, quality of service information, or a weighted average of historical utilization values.

BRIEF DESCRIPTION OF THE DRAWINGS

Other objects and advantages of the invention will become apparent upon reading the following detailed description and upon reference to the accompanying drawings in which:

FIG. 4 is a flow diagram of details of the data processing system of FIG. 2 according to a second embodiment of the invention;

FIG. 5 is a flow diagram illustrating details of powering off an active processor according to one embodiment of the invention; and FIG. 6 is a flow diagram illustrating details of powering on an additional processor according to one embodiment of the invention.

Figure 1:
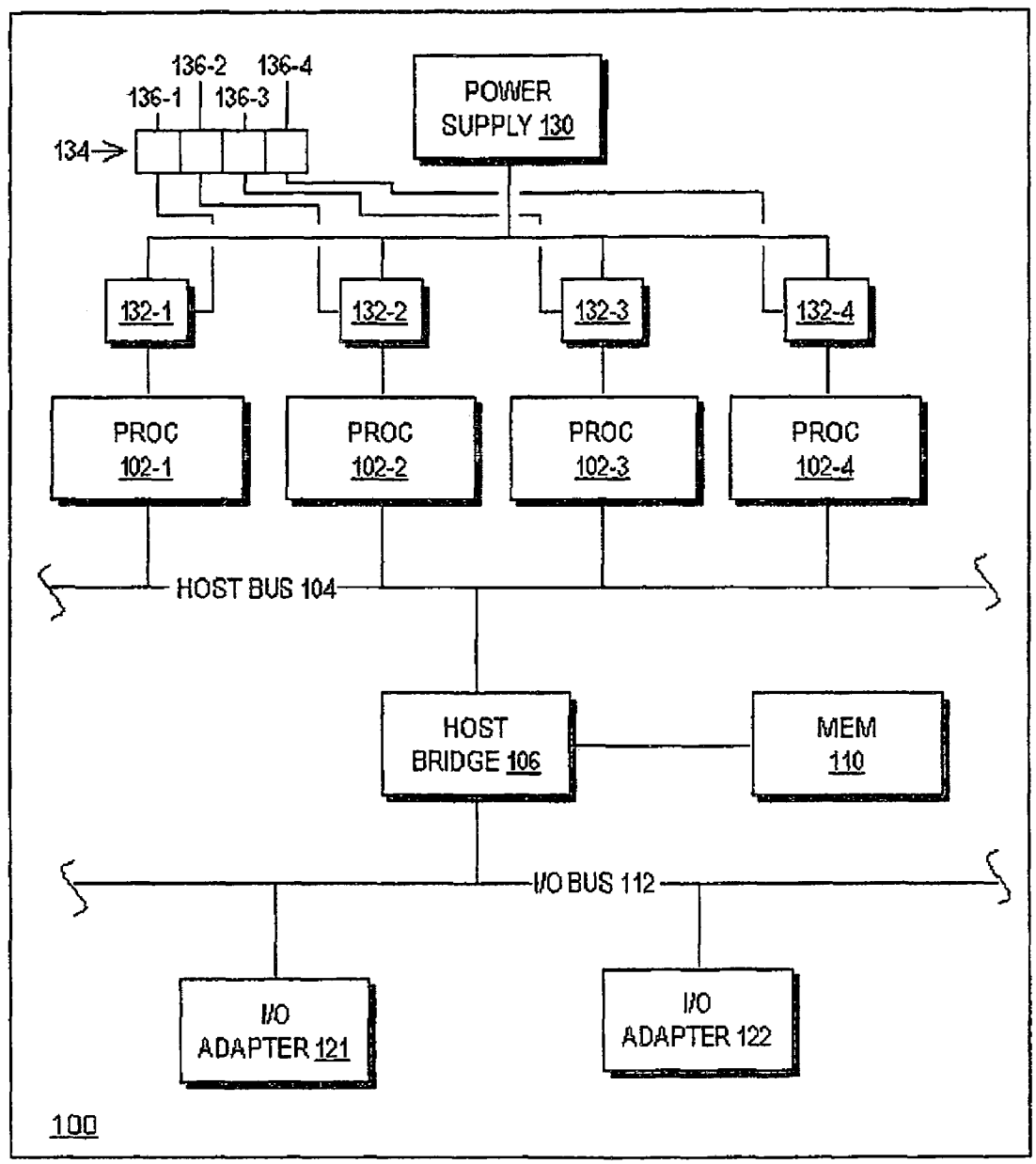
FIG. 1 is a block diagram of an SMP system suitable for implementing an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The subject matter of the present invention is related to the subject matter in S. Ghiasi & W. Felter, CPU Packing for Multiprocessor Power Reduction, which is incorporated by reference herein. A preferred embodiment of the present invention encompasses a system and method for conserving energy consumption in a multiprocessor data processing system. The preferred embodiment of the invention is capable of powering processors on and off without disruption to the overall functioning of the system. The system makes a periodic determination of a system's workload or utilization. Based on the determined level of utilization, the system then determines whether the number of processors that are currently active is adequate for the present workload. This determination is made by comparing the current utilization to one or more utilization thresholds. If the current utilization exceeds the maximum utilization threshold, the system may turn a processor on to increase number of processors that are active. If the current utilization is less than the minimum utilization threshold, the system may turn a processor off to decrease the number of active processors.

Turning now to the drawings, a block diagram of selected elements of a data processing system 100 suitable for implementing one embodiment of the present invention is depicted. In the depicted embodiment, system 100 includes two or more processors 102-1 through 102-4 (generically or collectively referred to herein as processor(s) 102). Each processor 102 has access to a shared system memory 110 via a host bus 104. System 100 is referred to as a symmetric multiprocessor (SMP) system because each processor 102 has equivalent access to system memory 110. Equivalent access indicates that the response time or latency associated with a memory access from a first processor 102-1 is substantially equivalent to the response time request from any other processor 102.

The multiple processors 102 of system 100 may be implemented in individual modules or packages where each package is attached to a system planar. In an alternative embodiment, system 100 is implemented with one or more multi-chip modules (MCM's) in which two or more processors 102 are packaged in a single carrier. Whereas the selection of a processor 102 for powering on and off is largely a matter of convenience in a non-MCM implementation (since all processors 102 are assumed to consume approximately equal energy), an MCM implementation of system 100 may benefit from biased selection of processors for powering on and off. More specifically, it may be beneficial in an MCM implementation to power off all processors 102 within a single MCM before powering off a processor 102 in a separate MCM, because powering off all processors 102 within an MCM would enable the system to power off an entire MCM and thereby conserve energy consumed not only by the MCM's processors, but also by any additional components within the MCM (e.g. a MCM cache memory). Thus, implementing the invention in an MCM configuration may require additional consideration in determining which processors to target, but the concept of the adjusting the number of active processors to reflect the system utilization remains the same.

Although the depicted implementation of system 100 is an SMP system, the invention is also applicable non-uniform memory access (NUMA) systems in which the system is comprised of a set of interconnected nodes, where each node has one or more processors and a local system memory. A representative NUMA system is described in B. C. Brock et al., Efficient Identification of Candidate Pages and Dynamic Response in a NUMA Computer, U.S. Pat. No. 6,499,028 B1. (See FIG. 1, FIG. 2, and the accompanying description), which is incorporated by reference herein.

Processors 102 of system 100 may be implemented with commercially distributed general purpose microprocessors including, as examples, PowerPC.RTM. family processors from IBM Corporation and x86 processors such as the Pentium.RTM. family of processors from Intel Corporation. In one embodiment, processors 102 may be implemented as discrete components (each in its own distinct package) or as one or more multi-chip modules (MCM's). In an MCM, two or processors 102 are provided within a single integrated circuit package.

A host bridge 106 of system 100 as depicted in FIG. 1 provides a pair of functions. Host bridge 106 serves as a memory controller that couples system memory 110 to host bus 104. In addition, host bridge 106 provides an interface between a host bus 104 and at least one peripheral bus or I/O bus 112 (only one of which is shown). I/O bus 112 may be implemented as a PCI (peripheral components interface) or PCI-X I/O bus although additional bus bridges may provide access to a low pin count (LPC) bus, an ISA (industry standard architecture) bus, and so forth. System 100 may employ a HyperTransport.™. I/O technology in lieu of or in addition to I/O bus 112. In the embodiment depicted in FIG. 1, I/O adapters 121 and 122 are connected to I/O bus 112. I/O adapters 121 and 122 may represent any of a variety of widely used adapters including graphics adapters, network communication adapters, audio adapters, disk controllers, and so forth.

FIG. 1 further illustrates the ability of system 100 to apply power to processors 102 selectively. Specifically, system 100 illustrates a power supply 130 and a set of switches 132-1 through 132-4 (generically or collectively referred to as switch(es) 132). Each switch 132 controls a connection between power supply 130 and a corresponding processor 102. In one embodiment, system 100 provides a mechanism enabling software control of switches 132. System 100 may include, as one example, a special purpose register 134, referred to herein as active processor control register 134, that includes bits 136-1 through 136-4 (generically or collectively referred to as bit(s) 136) corresponding to switches 132-1 through 132-4 respectively. Setting a bit 136 in active processor control register 134 activates (closes) the corresponding switch 132 while clearing a bit 136 opens the corresponding switch 132. Switches 132 maybe implemented with any circuit or device suitable for gating a first signal (the power signal) with a control signal. For example, switches 132 may be implemented as AND gates that receive a the power supply output as a first input and a control signal indicative of whether the CPU is active (1) or inactive (0) as a second input.

In some embodiments, portions of the invention may be implemented as computer executable instructions (computer software code). The instructions are stored on a computer readable medium, which may be a hard disk, a CD ROM, or another suitable persistent storage medium. During times when a processor such as a processor 102 is executing the instructions, the instructions may be stored in system memory 110 or in another volatile storage medium such as a cache memory (not shown). When executed by a processor, the instructions cause the data processing system to determine an optimal number of active processors for the system based on the current workload or utilization. The instructions further cause the processor to alter the number of active processors to conform with the optimal number, under the assumption that the optimal number is feasible. More specifically, if the optimal number is less than one or greater than N where N is the number of processors in the system, the optimal number is constrained.

FIG. 2 through FIG. 6 are conceptual representations, in the form of flow diagrams, of various methods that may be implemented as computer software code according to one embodiment of the present invention. The code represented by these flow diagrams are preferably implemented as kernel code in an operating system of data processing system 100. As described further below, the depicted embodiment includes code blocks for selectively turning on and turning off a processor 102 in a multiprocessor system such as system 100. If the operating system of data processing system 100 does not support powering on (activating) and powering off (deactivating) individual processors, the preferred embodiment of the invention includes an operating system that exposes an application program interface (API) that enables application programs to activate and deactivate selected processors. Additional detail regarding the activating/deactivation code blocks are described below.

Figure 2:
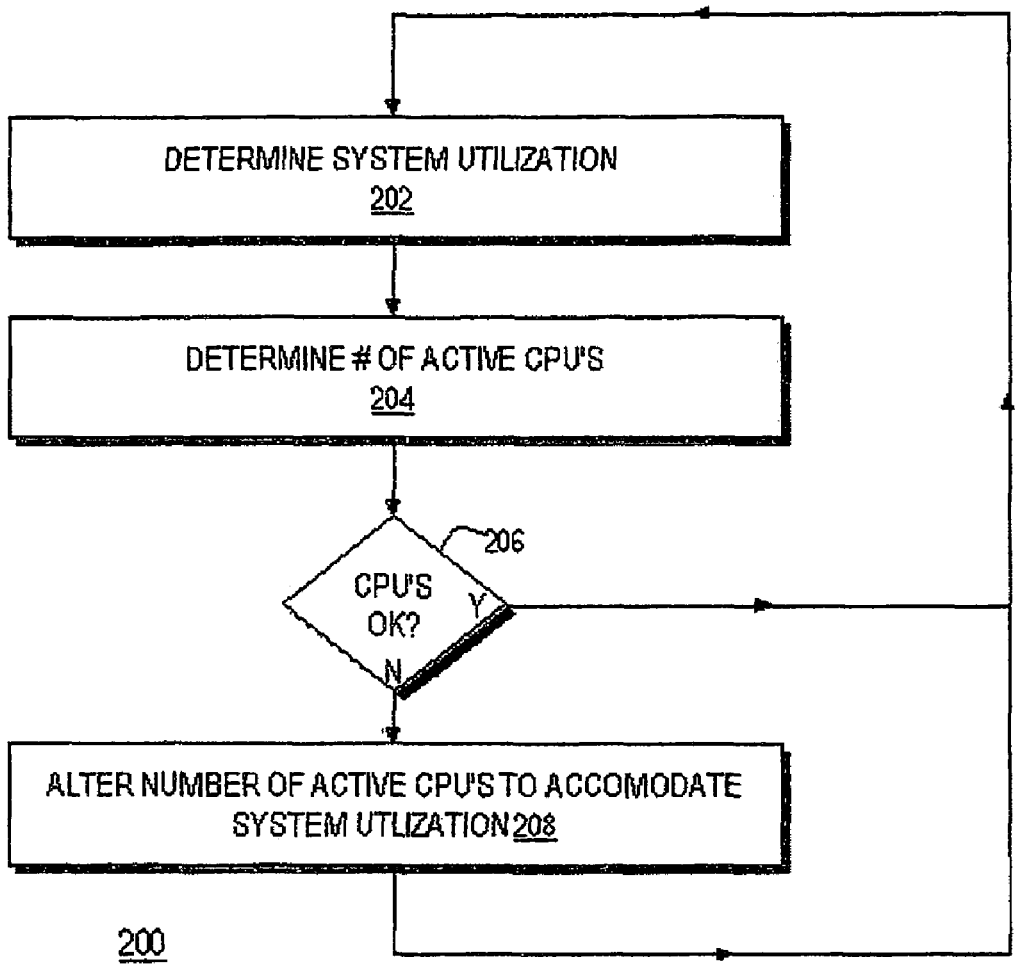
FIG. 2 is a flow diagram illustrating a method of conserving energy consumption in the data processing system of FIG. 1 according to an embodiment of the present invention.

Referring first to FIG. 2, a conceptual representation of a method 200 for conserving energy consumption in a multiprocessor or SMP data processing system is presented. The depicted implementation of method 200 includes determining (block 202) a measure of the system utilization. System utilization, as used herein, refers generally to processor activity (e.g., the number of active processor tasks, the number of instructions being executed, and so forth).

Utilization is an important consideration in a policy designed to reduce energy consumption by selectively powering off processors. When utilization is low, powering off one or more processors may have little discernible impact on system performance because the workload can be distributed over a smaller number of processors without increasing latency. When utilization is high, however, performance may degrade to a point at which the energy consumption cost associated with powering on an additional processor is justified in terms of the resulting increase in performance.

The system utilization determined in block 202 may be a relatively indirect measure of utilization or a relatively direct measure. At the indirect end of the spectrum, for example, block 202 may include estimating system utilization as a function of the number of tasks that are active in system 100. The number of active task provides an indirect measure of system utilization because each task is assumed to have an approximately equal impact on overall system utilization.

At the other end of the spectrum, system utilization may be estimated from the operation of the processor hardware. As an example, many processors include performance monitors. Performance monitors provide information about the internal functioning of a processor. A performance monitor might, for example, indicate the number of instructions that are issued or retired during a given period of time. Such information may provide a more direct measure of system utilization. Performance monitors, while desirable for their direct relationship to processor workload, are not implemented in a consistent fashion from one platform to the next. A technique for monitoring system utilization that relies on performance monitors or other similar hardware-specific gauges would most likely require customization for each operating system and hardware platform combination. Because it is generally desirable to implement methods that are independent of the specific hardware implementation of a system, this disclosure will focus on the use of a relatively indirect, but more generic, measure of system utilization. Additional detail regarding a specific implementation for determining system utilization is discussed below with respect to FIG. 3 and FIG. 4.

Returning now to FIG. 2, the depicted embodiment of method 200 includes determining (block 204) the number of active processors. For purposes of this disclosure, an active processor refers to any processor to which an operational voltage signal is applied. Thus, the term "active" does not indicate the level of activity or utilization of the corresponding processor.

Conventional multiprocessor systems typically apply power to the processors as a group such that all processors are either powered on or powered off. The preferred embodiment of the present invention, however, contemplates selective processor powering to match the number of active processors to the system utilization. In such a system, the number of active processors is likely to vary with time based on the current utilization. Determining the number of active processors for a system such as system 100 includes determining the number of bits 136 that are set in active processor control register 134 of FIG. 1. Following determination of system utilization and the number of active processors, method 200 includes determining (block 206) whether the number of processors is appropriate for the current utilization. The number of active processors is appropriate, for purposes of this disclosure, when each active processor is handling a workload that is substantial, but not so substantial that is causes performance to degrade below an unacceptable level. The appropriate number of processes thus reflects competing considerations, namely, the desire to maximize performance (increase the number of active processors) and to minimize energy consumption (decrease the number of active processors). Additional detail regarding this determination is described below with reference to FIG. 3 and FIG. 4.

If the number of active processors is appropriate for the current utilization, the status quo is maintained and method 200 returns, preferably after a predetermined delay period (not depicted), to block 202. if, however, the number of active processors is not appropriate for the current utilization, method 200 includes altering (block 208) the number of active processors to reflect or accommodate the current utilization. Altering the number of processors is preferably supported with a combination of hardware (e.g., the power supply switches 132 and register bits 136 of FIG. 1) and software in the form of kernel code described below with reference to FIG. 5 and FIG. 6.

Figure 3:
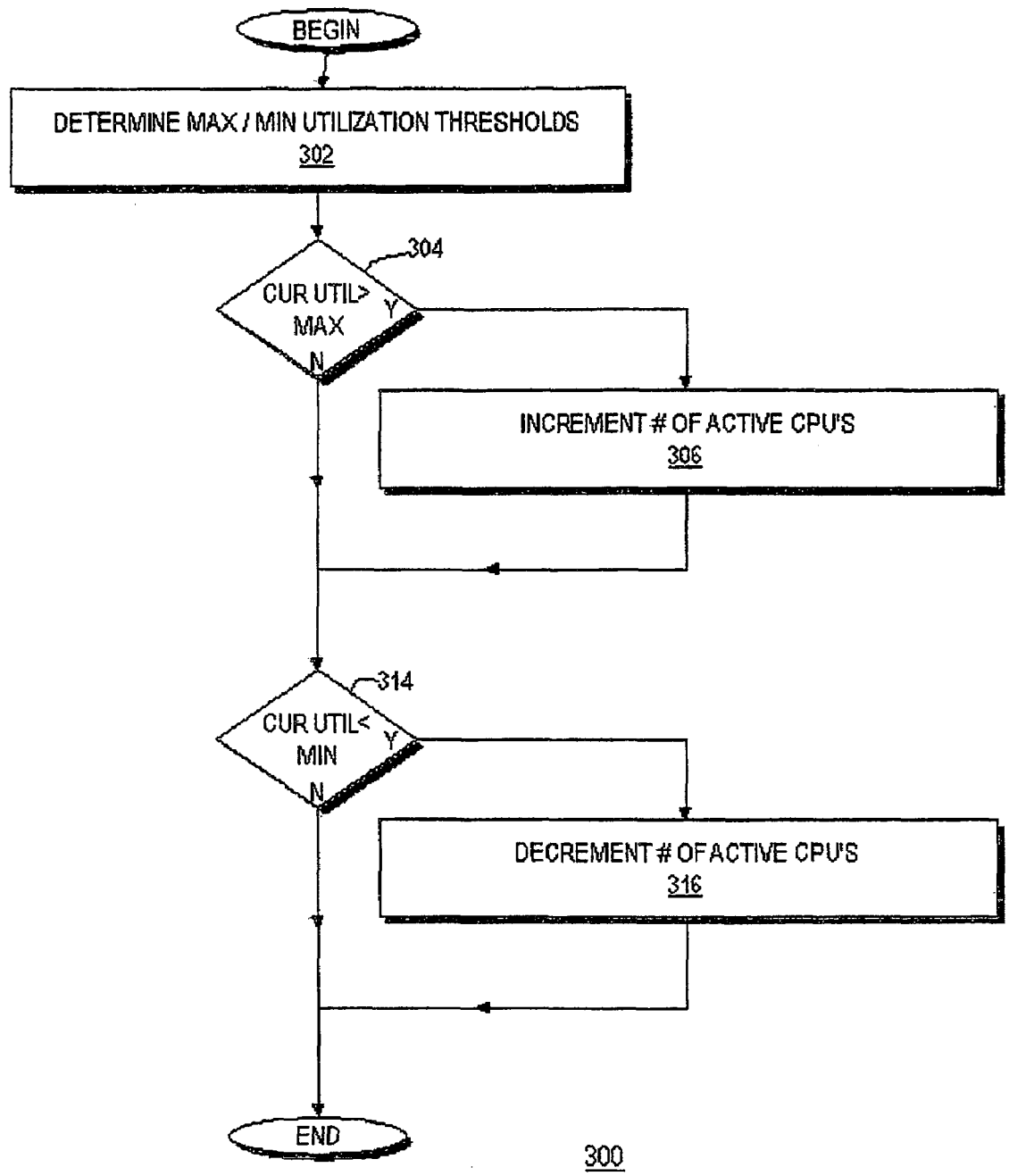
FIG. 3 is a flow diagram illustrating details of the method of FIG. 2 according to one embodiment of the invention.

Referring now to FIG. 3, a method 300 is presented to illustrate one implementation for adjusting the number of active processors to reflect the current utilization (blocks 206 and 208 of FIG. 2). In the embodiment depicted in FIG. 3, system 100 determines (block 302) maximum and minimum utilization thresholds. The maximum and minimum utilization thresholds may be predetermined or calculated once and saved in accessible storage. Alternatively, the maximum and minimum thresholds may be calculated periodically, each time the utilization is determined. Periodic determination of the thresholds may be desirable for an implementation in which the thresholds vary over time (e.g., to reflect historic utilization patterns), The utilization thresholds define a range of utilization appropriate for the current number of active processors. If (block 304) the current utilization exceeds the maximum threshold, the number of active processors is incremented (block 306). If (block 314), on the other hand, the number of active processors is lower than the minimum threshold, the number of active processors is decremented (block 316). In the preferred embodiment, incrementing and decrementing the number of active processors in blocks 306 and 316 respectively means incrementing or decrementing the number of active processors by one. This implementation reflects a desire to minimize the overhead associated with activating and deactivating processors in block 306 and 316. If the utilization is evaluated with sufficient frequency, constraining blocks 306 and 316 to altering the number of active processors by no more than one is considered to achieve desirable simplification without incurring a substantial performance penalty.

Referring now to FIG. 4, additional detail for a method 400 of determining the maximum and minimum utilization thresholds (block 302 of FIG. 3) according to one embodiment of the invention is presented. In the depicted embodiment, method 400 includes determining (block 402) a maximum utilization threshold. As described previously, the preferred embodiment balances the competing considerations of performance and energy conservation. The maximum utilization threshold reflects the performance consideration. More specifically, the maximum utilization threshold represents a limit of utilization above which one would expect the performance to drop below a desired target.

In one embodiment, utilization is measured or estimated in terms of the number of tasks that are active. Most commercially distributed operating systems are capable of executing multiple tasks concurrently. In addition, most operating systems expose the number of active tasks as a system variable so that the number of active tasks is readily available. In a Linux.RTM. environment, for example, the number of active tasks is contained in the nr_running system variable for each processor in the system.

Embodiments of the invention that measure system utilization in terms of the number of active tasks may specify the maximum threshold constant (and minimum threshold constant) in terms of tasks per processor. In this implementation, the threshold constant is independent of the number of active processors. Moreover, the determination of the maximum threshold constant in block 402 may have alternative implementations.

In an implementation desirable for its simplicity, a single maximum threshold constant is used for all applications. In this case, the maximum threshold constant preferably reflects a studied determination of the point at which additional tasks, if not accompanied by additional processing capacity (i.e., more active processors) will result in a level of performance that is unacceptable. A single value of maximum threshold constant may be acceptable in cases where, for example, the level of performance considered to be acceptable does not vary considerably.

In another implementation, the maximum threshold constant is not a single constant value. In such implementations, determining the maximum threshold constant in block 402 may include retrieving or determining a maximum threshold constant based on additional information that is indicative of performance considerations. For example, one implementation may employ different maximum threshold constants for different times of the day, days of the week, days of the month, and so forth. For any given application, acceptable performance levels may vary with the time. During business hours (e.g., Monday through Friday, 8:00 A.M. to 6:00 P.M.), a higher level of acceptable performance may be expected or required. In such applications, the maximum threshold constant may depend upon the time of day/date, et cetera. In this example, determining the maximum threshold constant in block 402 would include retrieving a maximum threshold constant based on the current date and time.

In another implementation, system 100 may have different quality of service expectations depending upon its application. System 100 may, for example, exist as part of a server cluster or data center that supports a variety of customer applications. In such an environment, system 100 may be supporting an application with a contractual quality of service expectation and the maximum threshold constant may be adjusted to reflect that reality. Specifically, when a quality of service arrangement is present that guarantees a specified level of performance, the maximum threshold constant may be lowered to provide a greater margin of error. A lower maximum threshold constant is "safer" in this context because system 100 will increase the number of active processors at a lower level of utilization.

In still another implementation desirable for avoiding excessive "thrashing" of the number of active processors, the maximum threshold constant reflects a moving average of historical utilization values. In this embodiment, periodic system utilization measures are stored in system memory 110 or in persistent storage. The maximum threshold constant may be determined by computing a moving average of the most recent K values of system utilization and adjusting the moving average with a factor. So, for example, one might determine a maximum threshold constant by computing the average of the five most recent utilization values, dividing the computed average by the number of active processors, and multiplying the result by 110%. In addition, the 110% value used in this example, might be altered depending upon the date and time or quality of service considerations referred to above.

Returning momentarily to FIG. 3, the moving average of system utilization values might also be used as the value against which the determination in block 304 and/or block 314 is made. In other words, method 300 might base the decision regarding increasing (or decreasing) the number of active processors on a recent average of system utilization rather than just the most recent value of system utilization. The moving average technique is desirable for its ability to "filter" transient utilization spikes that might otherwise cause an unwanted alteration of the number of active processors.

Moving average characteristics might also be altered depending upon the date and time or quality of service considerations referred to above.

Returning now to FIG. 4, having determined a maximum threshold constant, system 100 then determines (block 404) a maximum utilization threshold. In embodiments that specify the maximum threshold constant in terms of tasks per processor, the maximum utilization threshold is the product of the maximum utilization constant and the number of active processors.

In blocks 406 and 408, a minimum threshold constant and a minimum utilization threshold are determined in a manner substantially analogous to the determination of the maximum threshold constant and maximum utilization threshold in blocks 402 and 404 respectively. The minimum utilization threshold reflects the desire to conserve energy. When system utilization falls below the specified threshold, system adjusts the number of processors accordingly.

In one embodiment, the minimum utilization threshold for a system with N active processors is equivalent to the maximum utilization threshold for a system with N−1 active processors. This implementation maintains consistency between the threshold level causing the number of active processors to decrease from N to N−1 and the threshold level causing the number of active processors to increase from N−1 to N. In this embodiment, the minimum threshold constant determined in block 406 is the same as the maximum threshold constant determined in block 402 and the formula in block 408 is modified to replace N with N−1.

Referring back to FIG. 2, block 208 of method 200 includes altering the number of active processors to reflect or accommodate the system utilization. Referring now to FIG. 5 and FIG. 6, selected blocks for a method 500 (FIG. 5) of reducing the number of active processors and a method 600 (FIG. 6) of increasing the number of active processors are presented. Methods 500 and 600 include code blocks that work in conjunction with the hardware support (see FIG. 1) for selecting powering of processors 102.

The embodiment of method 500 depicted in FIG. 5 includes the steps needed to deactivate a processor without disrupting system functioning. Method 500 includes a block 502 in which system 100 migrates tasks (also sometimes referred to as processes or threads) assigned to the processor of interest (i.e., the processor to be deactivated) to the remaining active processors. Migration of tasks from the processor of interest to another processor is managed by a task scheduler of processor 100. Operating systems routinely provide task management functionality and this functionality may be leveraged to force the migration of all tasks executing on the processor of interest to another processor.

Similarly, any interrupt handlers that the operating system has allocated or assigned to the processor of interest must be migrated or reallocated (block 504) to another processor. Interrupt handlers provide functionality that enables system 100 to communicate with peripheral devices efficiently. A hard disk controller interrupt handler, for example, services interrupts issued by a disk controller. A multiprocessor system such as system 100 may not have a separate disk controller interrupt handler (or any other type of interrupt handler) active on each active processor. Instead, a single interrupt handler handles interrupts regardless of the processor with which the interrupt is concerned. Thus, an interrupt generated by a disk controller following completion of a disk task initiated by processor 102-2, might be handled by a disk controller interrupt handler on processor 102-4. As part of the interrupt handling, processor 102-4 would be responsible for either servicing the request itself or informing processor 102-2 that the disk has responded to a previously issued task request. The operating system may allocate the various interrupt handlers among the active processors so that any active processor may be "home" to one or more interrupt handlers. When a processor is selected for deactivation, the operating system must determine which if any interrupt handlers are located on the selected processor and migrate these interrupt handlers to processors that will remain active.

Method 500 also includes writing (block 506) any modified or "dirty" cache lines associated with the processor of interest out to system memory 110. Write back of dirty cache lines is required to maintain coherency in system 100. Although not depicted, system 100 most likely includes a memory subsystem hierarchy that includes a level one (L1) cache local to each processor, an L2 cache that may or may not be shared by two or more of the processors, and possibly a shared L3 cache. A dirty cache line in an L1 (or other unshared) cache of a processor selected to be deactivated must be written out through the memory hierarchy because the dirty cache line represents the most recent state of the corresponding data.

Method 500 further the actual powering off (block 508) of the selected processor 102 of system 100. Powering off of a selected processor may require or include resetting a bit 136 in active processor control register 134 of FIG. 1.

FIG. 6 depicts a method 600 for activating (powering on) a selected processor when system determines that an additional processor is needed. Method 600 is the functional opposite of method 500. As such, the depicted embodiment of method 600 includes powering on (block 602) the selected processor. The physical powering on (and off) of processors is facilitated by the switches 132 and dedicated register bits 136 of active processor control register 134 as depicted in FIG. 1. The register bits 136 are preferably exposed to the operating system kernel thereby enabling the operating system to apply power to processors 102 selectively.

Following activation of a processor, the system's active tasks and interrupt handlers may be redistributed (blocks 604 and 606 respectively). In one embodiment, the redistribution indicated in blocks 604 and 606 is "forced." More specifically, in such an embodiment, the operating system actively redistributes processes and interrupt handlers following activation of a new processor. In other embodiments, the distribution of tasks and interrupt handlers occurs passively. In this embodiment, the operating system will distribute new tasks and handlers to the newly activated processor preferentially because the newly activated processor will have less load associated with it. Through this natural task distribution process, system 100 will eventually arrive at a state in which tasks are approximately evenly distributed across all of the active processors.

It will be apparent to those skilled in the art having the benefit of this disclosure that the present invention contemplates a system and method for conserving energy in a data processing system by optimizing the number of powered processors in an SMP system to accommodate the existing workload. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
a plurality of processors, wherein said processors are connected to a host bus; a system memory accessible to said processors; means for measuring a utilization of the system;
means for determining a number of active processors, wherein the number is indicative of a power drawn by the data processing system;
means for determining whether the number of active processors is appropriate for the measured utilization; and
responsive to determining that the utilization is not appropriate, means for altering the number of active processors;
wherein the means for measuring the current utilization comprises means for determining a number of active tasks on the system;
wherein the means for determining whether the number of active processors is appropriate, comprises means for determining an upper threshold and comparing the utilization to the upper threshold and means for determining a lower threshold and comparing the utilization to the lower threshold;
wherein the means for altering the number of active processors includes means for incrementing the number of active processors if the processor utilization exceeds the upper threshold and means for decrementing the number of active processors if the utilization is less then the lower threshold;
wherein determining upper and lower thresholds includes determining upper and lower threshold factors and multiplying the upper and lower threshold factors by N and N−1 respectively, wherein N is the number of active processors;
wherein the upper and lower threshold factors are determined based, at least in part, on date information indicative of the day of month, day of week, and time of day.

2. The system of claim 1, wherein the upper and lower threshold factors are determined based, at least in part, on quality of service information indicative of a quality of service requirement associated with the system.

3. The system of claim 1, wherein the upper and lower threshold factors are determined based, at least in part, on a moving average of historical utilization measures.

4. A computer program product, stored on a computer readable storage medium, for conserving energy in a multiprocessor data processing system, the program product comprising:
computer code means for measuring a utilization of the system;
computer code means for determining a number of active processors, wherein the number is indicative of a power drawn by the system;
computer code means for determining whether the number of active processors is appropriate for the measured utilization; and responsive to determining that the utilization is not appropriate, computer code means for altering the number of active processors;
wherein the means for measuring the current utilization comprises means for determining a number of active tasks on the system;
wherein the means for determining whether the number of active processors is appropriate, comprises means for determining an upper threshold and comparing the utilization to the upper threshold and means for determining a lower threshold and comparing the utilization to the lower threshold;
wherein the means for altering the number of active processors includes means for incrementing the number of active processors if the processor utilization exceeds the upper threshold and means for decrementing the number of active processors if the utilization is less then the lower threshold;

wherein determining upper and lower thresholds includes determining upper and lower threshold factors and multiplying the upper and lower threshold factors by N and N−1 respectively, wherein N is the number of active processors.

5. The computer program product of claim 4, wherein the upper and lower threshold factors are determined based, at least in part, on quality of service information indicative of a quality of service requirement associated with the system.

6. The computer program product of claim 4, wherein the upper and lower threshold factors are determined based, at least in part, on a moving average of historical utilization measures.

7. A data processing system, comprising:
a plurality of processors;
a power supply configured to output an operational supply voltage;
a plurality of switches, wherein said switches are operable to selectively connect said processors to the operational supply voltage output of the power supply;
storage containing operating system code operable, when executed, to determine periodically a measure of system utilization and further operable to control the switches to alter a number of processors powered by the operational supply voltage of the power supply, wherein the number of processors powered by the operational supply voltage is based on the measured system utilization and a set of utilization threshold values;
wherein the means for measuring the current utilization comprises means for determining a number of active tasks on the system;
wherein the means for determining whether the number of active processors is appropriate, comprises means for determining an upper threshold and comparing the utilization to the upper threshold and means for determining a lower threshold and comparing the utilization to the lower threshold;
wherein the means for altering the number of active processors includes means for incrementing the number of active processors if the processor utilization exceeds the upper threshold and means for decrementing the number of active processors if the utilization is less then the lower threshold;
wherein determining upper and lower thresholds includes determining upper and lower threshold factors and multiplying the upper and lower threshold factors by N and N−1 respectively, wherein N is the number of active processors;
wherein the upper and lower threshold factors are determined based, at least in part, on date information indicative of the day of month, day of week, and time of day.

8. The system of claim 7, wherein the operating system code determines system utilization based on the number of active tasks.

9. The system of claim 7, wherein the utilization threshold values include a maximum utilization threshold and a minimum utilization threshold, wherein a measured utilization exceeding the maximum utilization threshold causes the operating system to increase the number of processors connected to the operational voltage signal of the power supply and further wherein a measured utilization of less than the minimum utilization threshold cause the operating system to decrease the number of processors connected to the operational voltage signal of the power supply.

10. The system of claim 7, wherein the system is a NUMA system comprising a set of interconnected nodes, wherein each node includes at least one processor and a local system memory.

* * * * *